(12) United States Patent
Alper

(10) Patent No.: US 6,491,822 B2
(45) Date of Patent: *Dec. 10, 2002

(54) PROTECTION OF CROSSFLOW MEMBRANES FROM ORGANIC FOULING

(75) Inventor: Hal Alper, Flowery Branch, GA (US)

(73) Assignee: Mycelx Technologies Corporation, Gainesville, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/870,594

(22) Filed: May 31, 2001

(65) Prior Publication Data

US 2002/0036168 A1 Mar. 28, 2002

Related U.S. Application Data

(63) Continuation-in-part of application No. 09/732,994, filed on Dec. 8, 2000, and a continuation-in-part of application No. 09/272,445, filed on Mar. 19, 1999, now Pat. No. 6,180,010

(60) Provisional application No. 60/079,210, filed on Mar. 24, 1998, and provisional application No. 60/169,656, filed on Dec. 8, 1999.

(51) Int. Cl.$^7$ .................. B01D 37/02; B01D 15/00; C02F 1/28

(52) U.S. Cl. .............. 210/650; 210/680; 210/688; 210/692; 210/693; 210/777; 210/799; 210/502.1; 210/504; 210/908; 210/909; 210/912; 210/913; 210/914

(58) Field of Search .................. 210/650, 651, 210/652, 680, 688, 692, 777, 799, 502.1, 504, 681, 690–691, 693, 908, 909, 912–914

(56) References Cited

U.S. PATENT DOCUMENTS

| | | | |
|---|---|---|---|
| 4,313,830 A | 2/1982 | Tulin et al. |
| 4,964,987 A | 10/1990 | Johnson |
| 5,259,952 A | 11/1993 | Lee |
| 5,437,793 A | 8/1995 | Alper |
| 5,527,466 A | 6/1996 | Li et al. |
| 5,698,139 A | 12/1997 | Alper |
| 5,746,925 A | 5/1998 | Alper |
| 5,837,146 A | 11/1998 | Alper |
| 5,961,823 A | 10/1999 | Alper |
| 6,001,244 A | 12/1999 | Salter et al. |
| 6,168,714 B1 | 1/2001 | Ilias et al. |
| 6,180,010 B1 | 1/2001 | Alper |

Primary Examiner—Robert J. Popovics
(74) Attorney, Agent, or Firm—Klauber & Jackson

(57) ABSTRACT

A method for improving the efficiency and usable life in a cross flow membrane filter used to remove contaminants from bilgewater. The bilgewater is passed upstream of the cross filter membrane through a fluid-pervious filtration media which has been infused with an absorbtion composition comprising a homogeneous thermal reaction product of an oil component selected from the group consisting of glycerides, fatty acids, alkenes, and alkynes, and a methacrylate or acrylate polymer component. The contaminants are thereby immobilized at the media. The purified output from the infused filtration media is then provided as input for the cross flow membrane filter.

15 Claims, 2 Drawing Sheets

PROTECTION OF CROSSFLOW MEMBRANES FROM ORGANIC FOULING

RELATED APPLICATIONS

This application is a continuation-in-part of Ser. No. 09/732,994, filed Dec. 8, 2000 (now allowed); and a continuation-in-part of Ser. No. 09/272,445, filed Mar. 19, 1999 (U.S. Pat. No. 6,180,010), which claims priority from provisional patent application Ser. No. 60/079,210, filed Mar. 24, 1998. This application also claims priority from provisional patent application Ser. No. 60/169,656 filed Dec. 8, 1999.

FIELD OF INVENTION

This invention relates generally to methods and apparatus for removing contaminants from aqueous systems, and more specifically relates to methods and filtration devices for removing undesired contaminants from bilgewater discharge.

BACKGROUND OF INVENTION

Over the past two decades, U.S. regulations dealing with oily bilgewater discharge for all types of vessels have grown increasingly stringent. Even the presence of a visible oil sheen is deemed objectionable under the Uniform National Discharge Standards ("UNDS"). Environmental technology has struggled to keep pace, but until recently no removal method has been capable of eliminating sheen and extracting harmful contaminants from bilgewater.

The Federal Water Pollution Act—also known as the Clean Water Act—accordingly proscribes even the appearance of a visible sheen on the water, punishable by a $5,000 penalty. More specifically, the act "prohibits the discharge of oil or oily waste into or upon the navigable waters of the United States or the waters of the contiguous zone if such discharge causes a film or sheen upon, or causes a sludge or emulsion beneath the surface of the water."

Further, under Sections 4301 (a) and (c) of the Oil Pollution Act of 1990, the fine for failing to notify the appropriate federal agency of a discharge has increased from a maximum of $10,000 to a maximum of $250,000 for an individual and $500,000 for an organization. The discharge of oil regulation, or "sheen rule," establishes the following criteria for determining a harmful oil spill:

Discharges that cause a sheen or discoloration on the surface of a body of water;

Discharges that violate applicable water quality standards; or

Discharges that cause a sludge or emulsion to be deposited beneath the surface of the water or on adjoining shorelines.

The sheen rule applies to both petroleum and non-petroleum oils—e.g., vegetable oil.

The discharge regulations also have been toughened for U.S. military vessels. The National Defense Authorization Act of 1996 amended Section 312 of the Federal Water Pollution Control Act to require the Secretary of Defense and the administrator of the U.S. Environmental Protection Agency (EPA) to develop UNDS for vessels of the armed forces for "discharges, other than sewage, incidental to normal operation". Previously, this section only addressed the regulation of sewage. In consequence U.S. military vessels are limited to oily bilge water discharge concentrations of 15 ppm under 40 C.F.R. part 1700, uniform national discharge standards (UNDS).

From an environmental perspective, the increased regulatory activity in bilgewater discharge limits is warranted. The cumulative effect of vessels ranging from small recreational boats to large surface ships dumping even small amounts of bilgewater could wreak damage upon fragile aquatic ecosystems—and likely has already done so.

According to nature of discharge (NOD) reports obtained from the U.S. Navy, the composition of untreated bilgewater is a varying assortment of oil and grease, oxygen-demanding substances, and organic and inorganic materials. These materials, the reports say, include volatile organic compounds, semi-volatile organic compounds, inorganic salts and metals. Oily bilge water indeed contains bio-accumulative persistent organic pollutants (POP's) such as polyaromatic hydrocarbons and chlorinated aromatic hydrocarbons, aromatic hydrocarbons (BTEX) and oil, copper, iron, mercury, zinc and nickel, in addition to emulsifying agents such as detergents and solvents. The common metals collected in bilgewater samples include arsenic, copper, cadmium, chromium, lead, mercury, selenium and zinc, while organics include benzene, isomers of hexachlorocyclohexane, ethyl benzene, heptachlor, heptachlor expoxide, napthalene, phenols, pthalate esters, toluene, trichlorobenzene and trichloroethane.

The primary sources of these contaminants are vessel propulsion systems and auxiliary systems that use fuels, lubricants, hydraulic fluid, antifreeze, solvents and cleaning chemicals. Certain waste streams such as steam condensate, boiler blowdown, drinking fountain water, and sink drainage located in various machinery spaces can also drain to the bilge.

In worst-case scenarios, environmentally irresponsible vessel operators have dealt with excess bilgewater by dumping it overboard. Others have tried to hide the telltale sheen with emulsifiers, though the damage is still done.

Currently, commercial and military surface ships primarily employ two different methods in dealing with bilgewater treatment and removal. Many of these vessels use oil water separator (OWS) systems to reduce the oil content of bilgewater prior to overboard discharge. Most of these large vessels also have an onboard systems for collecting and transferring bilgewater to a holding tank for later removal and disposal on shore.

In general, OWS technology is unable to meet the 15 ppm requirement. Many OWS systems on cruise and naval ships produce an effluent in the average range of 100–250 ppm. A ship equipped with an oil content monitor (OCM) has the ability to return bilge water, not meeting discharge standards to the OWS for reprocessing. The effluent concentration after OWS is more a measure of the degree of emulsification of the influent than of the efficiency of the OWS. With 100% non-aqueous phase pollutants, OWS are capable of achieving quite low effluent concentrations. All OWS systems operate on the principle of gravity separation driven by density differences. If the suspended particles or droplets have effectively neutral buoyancy, OWS ceases to be effective. Additionally, OWS systems are ineffective in removing colloidal metals and soluble compounds. By definition, these are close to or at neutral buoyancy. Accordingly there is a need to look for other properties to exploit in order to achieve the desired reduction of pollutants in bilge water.

SUMMARY OF INVENTION

In accordance with one aspect of the present invention, it has been found that the compositions disclosed in the present inventor's U.S. Pat. Nos. 5,437,793; 5,698,139; 5,837,146; and 5,961,823 (all of which disclosures are hereby incorporated by reference) have extremely strong affinities for the aforementioned contaminants in oily bilgewater; and that when oily bilgewater streams containing these noxious contaminants are passed through filtration media incorporating these inventive compositions, the contaminants are immobilized at the media, as a result of which concentration levels of the contaminants in the filtrate may be reduced to very low values, in some instances below detectable limits in a single pass. Use of the invention not only enables ready removal from the bilgewater of oils, greases and the like, but as well removal of pernicious slightly soluble organic compounds such as benzene, toluene, xylene, halogenated hydrocarbons, ethoxylated glycols, etc. These noxious contaminants are among the more difficult compounds to remove from water, and indeed most are carcinogenic. The solubility of the foregoing substances renders most prior art physical separation methods ineffective and causes formation of stable and pseudostable oily emulsions (miscelle size of 400 micrometers or less) which also don't respond well to gravity separation due to neutral buoyancy. Among the metal ions which additionally may be removable by the methods and apparatus of the invention are those of cadmium, chromium, copper, lead, nickel, zinc, arsenic, silver, and mercury.

In accordance with one aspect of the present invention, the oily bilgewater is passed through one or more filters incorporating the principles of the invention, prior to the bilgewater being actually discharged from the vessel. In this arrangement the filter or filters may simply be placed directly in the bilgewater discharge line, e.g. downstream of the bilgewater pump effecting the discharge flow. In a test of a typical such installation, and using a dwell time of one second and a flow rate of 20 gallons per minute, a filter in accordance with the invention reduced all contaminants to below detectable limits (BDL) at various percentages of oil contamination. The test results included removal of all sheen and visible discharge. The methods of the invention have the ability to remove from the bilgewater most mixed emulsions and lipohilic and hydrophilic organic compounds, in addition to many chelated and colloidal metals.

In another aspect of the invention; filtration media incorporating the applicant's aforementioned compositions, may be used in conjunction with cross current flow membranes, to reduce or eliminate the known tendency of such membranes to rapidly become fouled and inefficient when used to filter bilgewater. In this arrangement the filters of the invention can be placed upstream of the membrane filter. The ability of the inventive filters to absorb concentrated slugs without breakthrough or significant pressure drop makes them ideal chemical prefilters to work in conjunction with membrane systems.

Almost half the cost of wastewater filtration utilizing membrane technologies (reverse osmosis, RO) arises from clearing clogged and fouled filtration membranes (*Business Week* 2/26/01). These membranes are composed of water repellant (hydrophobic), oil attracting polymers. Hydrophilic polymer membranes generally do not have the required mechanical strength for membrane filtration applications. Hydrophobic polymeric membranes are clogged easily by medium to high molecular weight proteins and oily oleophilic molecules that are suspended in water. Membrane clogging makes it necessary to use anti-clogging chemical additives. In spite of this, frequent maintenance and cleaning of the membranes is required. Chemical cleaning additives tend to denature the membrane making replacement necessary. Membranes are very expensive making this an undesirable scenario. Experimental attempts have been made to dope hydrophobic membranes with hydrophilic polymers during membrane fabrication. Although a ten fold performance improvement is anticipated, the results are experimental and doping with hydrophilic polymers could lead to unanticipated problems such as increased scaling due to inorganic pollutants which are also hydrophilic. Oleophilic pre-filters in accordance with the invention are capable of removing 100% of high molecular weight and non-aqueous phase organic compounds in one pass with close to zero pressure increase across the filter to saturation. Pre-filtration with these units eliminates organic fouling of membrane filtration devices resulting in 50% decrease in operating cost, twenty fold increase in efficiency and ten fold reduction of filter turnover.

Filter configurations incorporating the applicant's above described compositions (hereinafter referred to as "absorbent compositions") may be based on various water permeable substrates, such as shredded, spun or otherwise configured polypropylene or shredded or spun cellulose, which substrates are infused or otherwise treated with the absorbent compositions, which are then cured. These substrates may then be packed or otherwise disposed in a cartridge or canister filter; or can be formed into cured and infused bag filters which can be emplaced in canisters through which the contaminated bilgewater is flowed. Similarly the said absorbent compositions can be incorporated into or upon other filtering substrates and media, such as paper, including compressed pulp materials, particulate porous foamed plastics, mineral particulates such as perlite and vermiculite, and particulate, fibrous or porous ceramic or porous (e.g. sintered) metal substrates and media. For purposes of the present specification the term "chemical affinity separation" may from time to time be used to refer to the use of otherwise conventional filter materials which have been infused with curable polymeric surfactant (herein "PS") as discussed in the above referenced patents. The resultant filter will for convenience be referred to as a "PST filter", i.e., a filter based on "polymeric surfactant technology". Once cured into a substrate, the oleophilic properties of PS are transferred into a substrate thereby greatly enhancing its ability to attach organic compounds to its matrix. Once attached, these compounds become hydrophilic and tend not to re-release.

DESCRIPTION OF PREFERRED EMBODIMENTS

Figure 1:
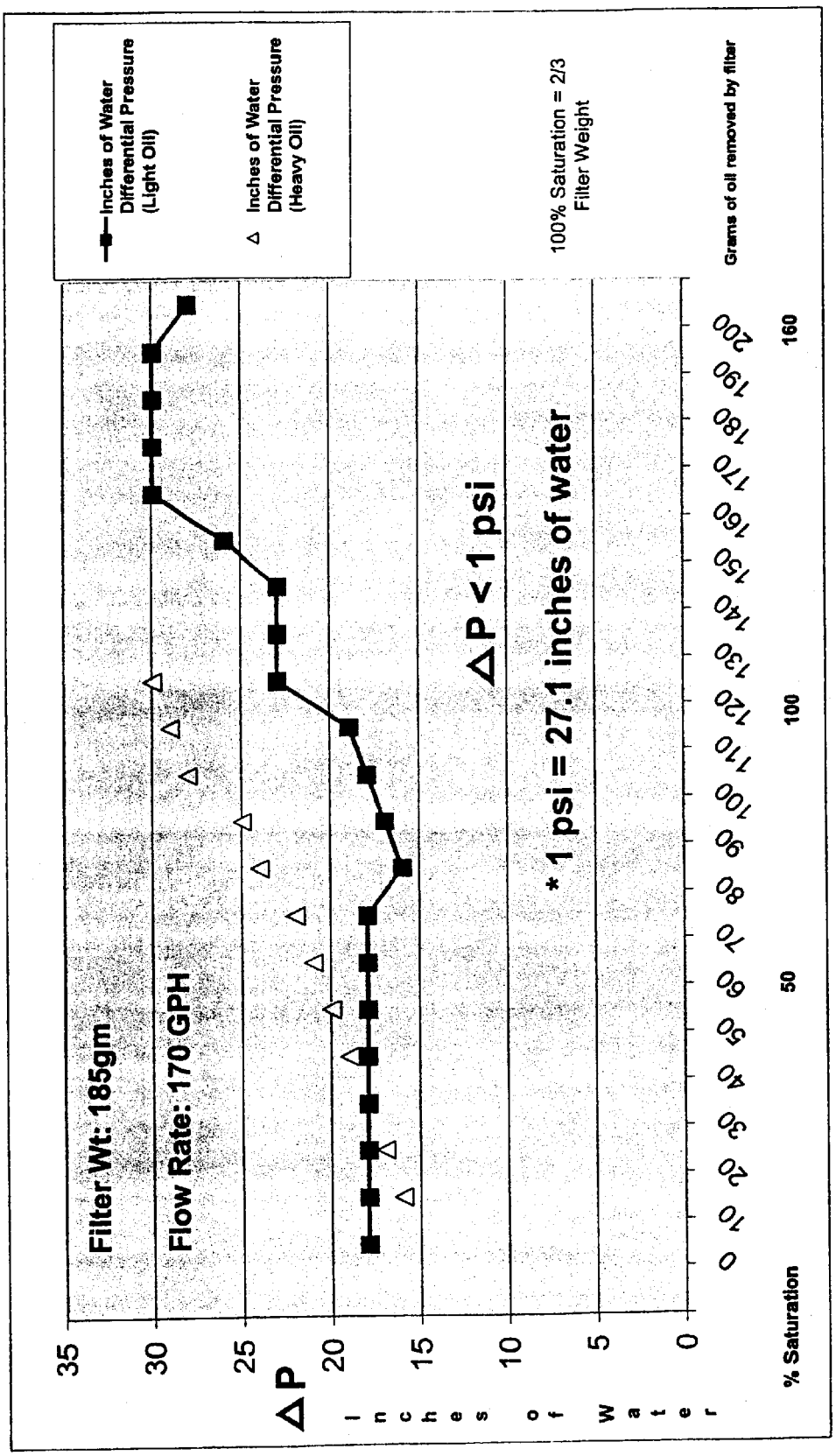
FIG. 1 is a graph depicting typical changes in pressure drop across a PST filter of the type used in the invention as oil is absorbed in the filter.

It should be appreciated that the use herein of the term "absorbent composition" is one of convenience for identifying the compositions of my aforementioned patents and patent applications. The specific mechanism by which the noxious contaminants are removed from the bilgewater streams by conjunctive use of the "absorbent compositions" is not completely understood, and could include attachment and/or fixation of such contaminants by mechanisms which technically involve various physical and/or chemical interactions. The term "absorbent" as used herein is intended to encompass all of these possible mechanisms.

The absorbent composition disclosed in the first of my aforementioned patents, i.e. U.S. Pat. No. 5,437,793, is characterized therein as a coagulant product which comprises a glyceride such as linseed oil reacted with a polymer such as poly (isobutyl methacrylate) which is then diluted with a solvent, such as 2,2,4-trimethyl-1,3-pentanediol monoisobutyrate. The composition formed by the thermal reaction of the linseed oil with the isobutyl methacrylate polymer is a soft resinous product which, when diluted with a solvent, results in a mixture that in the teaching of the said patent can be sprayed onto an oil spill or otherwise introduced to the oil spill to coagulate the oil. Additionally, however, and as disclosed in my further U.S. Pat. No. 5,698,139 patent and copending applications above cited, further experimentation has led to the discovery of additional absorbent compositions produced from polymers and a variety of natural animal and vegetable oils, fatty acids, alkenes and alkynes, which absorbent compositions are all utilizable in the filters and filtration processes of the present invention. More generally these latter compositions are the thermal reaction product of a polymer component with an oil component selected from the group consisting of glycerides, fatty acids, alkenes and alkynes. The reaction conditions can be adjusted to provide a "first endpoint" product or a "second endpoint" product. Preferred compositions are disclosed which comprise the thermal reaction products of methacrylate polymers with a glyceride derived from a variety of natural animal and vegetable oils, or the thermal reaction products of methacrylate polymers with a fatty acid or alkene or alkyne containing from about 8–24 carbon atoms. The combination of a methacrylate polymer component with any of these oil components can provide either a first or second endpoint product, depending upon the reaction conditions. The term "first endpoint product" is used to describe the solubility product of the reaction which is a cooperative structure held together by many reinforcing, noncovalent interactions, including Van Der Waals attractive forces. The term "second endpoint product" is used to describe the product of the reaction which is the result of covalent bond formation between the polymer component and the oil component, as indicated by the change in molecular weight.

The absorbent composition is readily synthesized from a polymer component and an oil component selected from the group consisting of glycerides, fatty acids, alkenes and alkynes. In a preferred embodiment, the product is synthesized from an isobutyl methacrylate polymer, and the oil component is one derived from a natural oil, such as linseed oil or sunflower oil. Optionally, the composition is then diluted with a solvent, such as 2,2,4-trimethyl-1,3-pentanediol monoisobutyrate or acetone. The diluted composition can then be applied to a desired substrate for use as a filtration media pursuant to the present invention.

The polymer component of the absorbent composition is a synthetic polymer such as polymers derived from methacrylates. Preferably, the polymer is derived from methyl methacrylate, ethyl methacrylate, isobutyl methacrylate, or n-butyl methacrylate, or may be a copolymer containing a methacrylate polymer. Most preferably, the polymer is a poly(isobutyl methacrylate) polymer such as that obtainable from ICI Acrylics as ELVACITE® 2045, or a methacrylate/methacrylic acid copolymer such as ELVACITE® 2008 or 2043. However, it is anticipated that other equivalent polymers can be used to prepare equivalent compositions of the invention. Combinations of polymers can be used to advantage in the preparation of the absorbent compositions.

The test used to determine whether or not a polymer can be used in preparing the absorbent compositions of the present invention is to combine the polymer component in question with the oil component, as set forth herein, to see if the resultant combination forms a homogenous product after heating. Ideally, the polymer component percentage of the composition should range from about 15–75%, preferably 20–40%, or more preferably from about 25–35%, by weight.

In one embodiment of the absorbent composition, the oil component of the composition is a glyceride derived from oils of vegetable or animal origin. Vegetable oils are obtained by cold pressing the seeds of a plant to obtain the oil contained therein. Of the vegetable oils, drying oils such as sunflower, tung, linseed, and the like; and semi-drying oils, such as soybean and cottonseed oil, have been shown to be useful as the glyceride component of the invention. Animal oils, such as, for example, fish oil, tallow and lard can also be used as a glyceride component of the composition. It is anticipated that any drying oil or semi-drying oil will work in the composition. Generally, a drying oil is defined as a spreadable liquid that will react with oxygen to form a comparatively dry film. Optionally, combinations of two or more glycerides can be used as reactants with the polymer to provide absorbent compositions useful in the present invention.

In a preferred embodiment, the oil component of the absorbent composition is a glyceride derived from a drying oil, such as linseed oil, that can be obtained from Cargill, Inc. as Supreme Linseed Oil, or sunflower oil. The glyceride should comprise from about 25–85%, preferably about 60–80%, and most preferably, from about 65–75% of the coagulant composition. All percentages in this disclosure are by weight, unless otherwise stated.

Where the oil component of the composition is a fatty acid or alkene or alkyne utilized as the reactant with the polymer, it contains from about 8 to 24 carbon atoms, and preferably from about 10 to 22 carbon atoms. Such fatty acids, alkenes and alkynes are commercially available from many suppliers. Typical fatty acids include both saturated and unsaturated fatty acids, such as lauric acid [dodecanoic acid], linolenic acid, cis-5-dodecanoic acid, oleic acid, erucic acid [cis-docosanoic acid], 10-undecynoic acid, stearic acid, caprylic acid, caproic acid, capric acid [decanoic acid], palmitic acid, docosanoic acid, myristoleic acid [cis-9-tetradecenoic acid], and linoleic acid. Typical alkenes and alkynes contain at least one and preferably one or two degrees of unsaturation, and from about 8 to 24 carbon atoms, with 10–20 carbon atoms being preferred. Preferred alkenes and alkynes are those such as 1-decene, trans-5-decene, trans-7-tetradecene, 1,13-tetradecadiene, 1-tetradecene, 1-decyne, and 5,7-dodecadiyne.

The absorbent composition is a product with characteristics different from either of the starting materials or a simple mixture of the two starting materials, thus showing that a new composition is produced by the thermal reaction. Specifically, the oil/polymer absorbent compositions pass a clear pill test after being heated at the elevated temperatures and do not separate into two parts upon being cooled but, rather form a homogenous, uniphase compound.

More specifically, the solvent can be selected from aliphatic hydrocarbons, aromatic hydrocarbons, alcohols, ketones, ethers, aldehydes, phenols, carboxylic acids, synthetic chemicals and naturally occurring substances.

The absorbent composition used in the present invention may be prepared by a thermal reaction process. The first step of the process involves heating the oil component (glyceride or fatty acid or alkene or alkyne) to approximately 235–350°

F. at a rate of about 5° F. per minute with continuous stirring. Then, the polymer component, usually in powdered form, is slowly stirred into the heated oil component. Depending upon the particular reactants used, the oil component should range from about 25–85%, preferably about 65–80%, more preferably about 72–77%, and the polymer should range from about 1–50%, preferably about 20–40%, more preferably about 23–28%, of the coagulant composition. After this mixture has been mixed properly, the mixture should be heated to approximately 400–700° F., depending on the particular components utilized for the reaction, and the desired endpoint of the reaction. Typically, reaction temperatures below about 500° F. produce "first endpoint products" while temperatures above about 500° F. produce "second endpoint products" The mixture should be heated at that temperature until a clear pill test indicates that the reaction has reached its first end point, i.e., a drop of the reaction mixture when placed on a clear glass plate is clear. When a clear pill test indicates that the reaction has reached its first end-point, the mixture should be cooled to a temperature below 200° F., generally about 180° F. After cooling, the coagulant product can be diluted with a suitable solvent to form a more liquid product that is easier to handle and use. The temperature at which the solvent is added is not critical, but the solvent should be added at a temperature where the coagulant composition is still pliable and the solvent will not rapidly evaporate.

Two reactions appear to occur between the oil component and the polymer component based upon the temperature and time. The first endpoint of the reaction results in a rubbery viscoelastic, relatively soft product with a melting point in the range of 100° F. to 250° F. This first endpoint product is homogeneous and does not separate upon melting or dissolution. This reaction occurs at 350° F–500° F. This is designated the "first endpoint product" (solubility product).

In the second reaction, the polymer undergoes complete or partial chain fission into discrete polymer free radicals at a temperature above about 500° F. At between 350° F. to 500° F., it is believed that partial chain fission of the polymer component (isobutylmethacrylate polymer has a m.w.=300,000 Daltons) occurs at the end of the chain or in the middle. This results in a lower molecular weight product. It is believed that there may also be a solubility reaction occurring (similar to Sn and Pb forming solder) within the ternary composition. The occurrence of a chemical reaction is confirmed, however, due to the change of molecular weight.

Reactions at above 500° F. and up to 900° F. maintained at temperature from 5 minutes to 20 hours, depending on activation energy of compositions, result in the second endpoint product. This reaction is visually observable by color, rheology, and specific heat change in the product [Note: For the first endpoint product the end of the reaction is observed by change in color and a rheology change and the cessation of solution outgassing. There is also a change in specific heat as measured by Differential Scanning Calorimetry]. The second endpoint product has a weight average molecular weight in the range of about 62,000 Daltons which is consistent with complete chain fission of the polymer, resulting in smaller free radicals which results in a lower molecular weight compound. The melting point of these products is usually above 300° F. if the oil component is highly unsaturated, which results in a solid product due to the formation of highly bonded three dimensional densely packed molecular matrix. If the oil component has a low degree of unsaturation, the resultant product is usually liquid, which is consistent with this type of reaction.

The oily component and the polymer component are reacted in a thermal reaction that does not appear to be sensitive to the atmosphere under which the reaction is carried out, i.e., whether it is an inert, oxidizing or reducing atmosphere. Absorbent compositions have been prepared by this reaction which range from soft to hard, and elastomeric to brittle in nature depending upon the ratio of the oil component to the polymer component and the choice of the polymer component and/or the oil component used. If the reaction mixture separates into two phases upon cooling it is not useful for the invention. In this manner, any polymer can be identified for use in the invention.

The mechanism of the thermal reaction remains to be elucidated. While not wishing to be bound by any theory in this regard the reaction appears to be a polymerization or phase transition reaction brought about by heat and which is stable at lower temperatures. It is hypothesized that the elevated temperatures create monomer free radicals of the polymers and copolymers which then crosslink with the unsaturated glyceride molecules. It is also hypothesized that perhaps a phase transition is occurring between the oil component and the polymer component. In an effort to determine what type of interaction or reaction is occurring between the oil component and the polymer component, thermal analysis of several of the absorbent compositions was conducted. The results indicate that a reaction is occurring between the oil component and the polymer.

Differential scanning calorimetry (DSC) was thus performed on several such compositions. DSC is a thermal analysis technique that measure the quantity of energy absorbed or evolved by a sample in calories as its temperature is changed. The sample and a reference material are heated at a programmed rate. At a transition point in the sample's heating, such as when it reaches a melting point, the sample requires more or less energy than the reference to heat. These points are indicated the typical DSC readout.

Samples were taken at the beginning of the reaction procedure described earlier and at the end of the reaction. The DSC profile for the initial starting materials is dramatically different from the profile of the product. The initial profile showed two exothermic events when the DSC analysis is carried out from 40–280° C., one event occurring at about 100° C. and the other at about 217° C. In the DSC profile of the reaction product, however, there was only one exothermic event, occurring at about 261° C. The samples were taken at initial and final points during the reaction and allowed to cool to room temperature before being subjected to the DSC.

In the instance of a further reaction, DSC's of the starting materials and final product were obtained. Again, the DSC curves generated show that two thermal events occurred for the "just mixed" reactants while only one thermal event occurred for the final product. Thus, the DSCs indicated that the occurrence of a reaction or phase transformation. Similar evidence obtained from IR spectra analysis also confirms that the absorbent compositions used in the invention are distinct products from the reactants used to prepare the absorbent compositions.

EXAMPLE 1

In order to prepare a PST filter substrate for use with the invention, an infusion solution is prepared from a suitable solvent and the absorbent composition. In this example a solution was prepared from 90 w/w 99.9% acetone and 10 w/w absorbent composition which is the reaction product of 31% isobutyl methacrylate, 31% ELVACITE 2045, and 66% linseed oil. The absorbent composition is added to a closed explosion-proof mixer with the acetone and mixed for 12 hours or until the solution becomes homogeneous. The substrate in this Example was a nonwoven polypropylene, viz. the VERASPUN material of Yarorough & Co., Inc. of High Point NC. This material has a weight of 1 oz./square ft. The substrate material was immersed in the infusion solution until saturated, then removed and excess liquid allowed to drip off. The material was then placed in a convection oven at 110 to 120° F. until acetone free. The material was then cured at room temperature for one week. The resulting material was then shredded and subsequently used in filter configurations.

EXAMPLE 2

A wastewater sample deemed to be representative of a typical bilgewater and containing a large variety of contaminants was subjected to filtration using devices and methods in accordance with the present invention. The Serfilco cartridge unit utilized in the test holds 12 Amtek 10″ spunbound polypropylene filters (Ametek, Inc., Sheboygan, Wis. 53082) in a parallel arrangement. Each filter element had been infused with about 17% by weight of the absorbent composition of the invention, by the procedure described in Example 1. A sample was processed in a single pass through the filter assembly. Flow rate through the filter was approximately 30 gpm, with dwell time in the filter assembly being 1 to 2 seconds. The contaminant concentrations for the input and output sample was measured and are shown in Table 1 below. It will be evident that outstanding removal of both organic contaminants and inorganic pernicious metallic ions has been achieved.

TABLE 1

| Input Wastewater | Purified Filtrate (mg/l) |
|---|---|
| Biochemical Oxygen Demand (5 Day) (405.1), mg/l | 230 |
| Suspended Solids (160.2), mg/l | 120 |
| Oil & Grease (1664), mg/l | 14 |
| Phenolics, Total Recoverable (420.2), mg/l | 0.078 |
| Cyanide (335.2), mg/l | <0.010 |
| Cadmium (200.7), mg/l | <0.0050 |
| Chromium (200.7), mg/l | 0.012 |
| Copper (200.7), mg/l | <0.025 |
| Lead (200.7), mg/l | <0.0050 |
| Nickel (200.7), mg/l | <0.040 |
| Zinc (200.7), mg/l | 0.19 |
| Arsenic (200.7), mg/l | <0.010 |
| Silver (200.7), mg/l | <0.010 |

EXAMPLE 3

Filter Test Results

Effectiveness of the treated filter material of Example 1 is illustrated as a selective oil and organic chemical filter. The identity of these samples and the procedure are as follows:

| 1d - 5,000 ppm | Gasoline |
|---|---|
| 2d - 5,000 ppm | Emulsified Diesel Fuel |
| 3d - 20,000 ppm | Emulsified Light Crude Oil |
| 4d - 50,000 ppm | (50/50) Toluene/Xylene |

Procedure: 750 g. of deionized water (20 megaohm) spiked with quantity sufficient dopant to achieve desired initial concentrations was passed through a tube of shredded polypropylene(VERASPUN) material 1 (weight=40 g) at a rate of about 0.5 L/minute with approximate contact time of 1.5 sec. The entire 750 ml was processed through the filter material and collected. A 50 ml sample of each effluent was drawn and analyzed using the standard EPA method for total organic carbon.

Conditions: contact time=1.5 sec. Filter wt=40 gm Effluent wt=750 gm

| Results | Initial Concentration | Final Concentration |
|---|---|---|
| Gasoline | 5,000 ppm | 93.9 ppm |
| Emulsified Diesel | 5,000 ppm | 60.2 ppm |
| Emulsified Light Crude Oil | 20,000 ppm | 74.3 ppm |
| Toluene/Xylene | 50,000 ppm | 91.7 ppm |

As can be seen, even with a massive amount of contamination, the purification factor ranges from 50× to 500× even though the dwell time was short and the weight of water processed exceeded the filter weight by 20×. There was noticeable channeling during this test. The final concentration would have been even lower after one pass without the channeling.

EXAMPLE 4

Seven further samples of contaminated water were subjected to the following test. Using the procedure of Example 1, an AMETEK 5 micron polypropylene sediment filter Model P5 (Ametek, Inc., Sheboygan, Wis. 53082) was infused with the absorbent composition and allowed to cure. This PST filter was subsequently placed in a polypropylene filter cartridge assembled and attached to a centripetal pump with a flow rate of 3 gal/min. One liter solutions of the following contaminated water samples were prepared.

1) 2% Light Crude Oil/$H_2O$
2) 0.5% W/W Gasoline/$H_2O$
3) 2% Light Crude Oil/$H_2O$
4) 100 ppm III Trichloroethane/$H_2O$
5) 0.7% Light Crude Oil/$H_2O$
6) 100 ppm III Trichloroethane/$H_2O$
7) 100 ppm Naptha/$H_2O$ Each entire sample was placed in a 3 liter beaker and allowed to circulate through the pump for one minute. At that time, a 100 ml sample was taken from the outflow hose on the pump. The samples after being passed through the filter were subjected to total organic carbon (TOC) analysis, using the procedure of U.S. EPA "Methods for Chemical Analysis of Water and Wastes, 1979, Revised 1983." Method 415.1.

Results were as follows:

TABLE 2

| Initial Sample | Resulting TOC (mg/L) |
|---|---|
| 1) 2% Light Crude Oil/$H_2O$ | 14.3 |
| 2) 0.5% W/W Gasoline/$H_2O$ | 34.4 |
| 3) 2% Light Crude Oil/$H_2O$ | 38.5 |
| 4) 100 ppm III Trichloroethane/$H_2O$ | 18.2 |
| 5) 0.7% Light Crude Oil/$H_2O$ | 10.9 |
| 6) 100 ppm III Trichloroethane/$H_2O$ | 5.9 |
| 7) 100 ppm Naptha/$H_2O$ | 15.8 | mg/L = Parts Per Million (ppm)

EXAMPLE 5

A 250 ml solution was prepared of 300 parts per billion (PPB) Arochlor 1254 in hexane. This test solution was poured through a funnel containing approximately 3 g of strips of PST filter material prepared as in Example 1. The absorbent composition of Example 1 constituted 5% by weight of the woven polypropylene material infused with the absorbent. Dwell time of the solution in the funnel was about 1 to 2 seconds. The filtrate having passed through the filter material was analyzed by gas chromatography, from which it was determined that 42% of the PCB 1254 was removed in the single pass.

EXAMPLE 6

PCB contaminants such as are considered in Example 5 are common in various industrial discharges, and can also occur in bilgewater. In order to demonstrate use of the invention in removing these contaminants, a further series of tests was run on aqueous input samples to which small concentrations of a PCB, viz. Arochlor 1254 had been added. The filtration apparatus used for the tests was a recirculating pump unit containing one 10", 5 micron average pore size spunbond polypropylene filter. The filtering media was infused with 10% by weight of the absorbent composition of the invention, by the procedure described in Example 1. The filtration process was conducted by using the recirculating pumping arrangement at a flow rate of 1.35 gal/min for a 1 minute and a 10 minute recirculation period. Analysis of the PCB content was carried out using EPA Method 608, the Detection Limit being 1.0 ppb. The samples had an input PCB level of 23 ppb. With 1 minute circulation the PCB level had dropped to 2 ppb. At 10 minutes circulation the PCB concentration was BDL. It appeared that the rate of PCB removal was so fast that the samples went BDL almost immediately after the 1 minute sample points. The tests indicate that the present invention removes PCBs, even at very low concentrations, down to below the acceptable discharge limit of 0.5 ppb in a very short time period.

EXAMPLE 7

A series of tests was run on aqueous input samples to which small concentrations of methyl tertiary butyl ether (BE) had been added. Following filtration under various conditions and with several differing substrates, the filtered samples were tested using a GCI-8160 gas chromatograph apparatus of SRI Instruments. A PID detector was used with helium as the carrier gas. The results are shown in Table 3 below. In tests 1 through 7 the filtration media consisted of 12 Ametex 10" spunbound polypropylene filters fit into one Serfilco cartridge unit. The filtering media was infused with 2% by weight of the absorbent composition of the invention, by the procedure described in Example 1. The filtration process was conducted by using a recirculating pumping arrangement for a recirculation period as specified in Table 3. In tests 8 and 9 of Table 2, the filtration media consisted of a non-woven polypropylene filter having average pore size of 5 microns. In test 8 the filter material had been infused with 2% by weight of the thermal reaction product of 10% isobutyl methacrylate and 90%ESSKOL, the latter being a bodied linseed oil product produced by Reichold Chemical. In test 9 the Esskol was replaced by CYKELIN, which is similarly a bodied linseed oil product of Reichold Chemical. The infusion procedure was similar to that described in Example 1 except for the differences in the absorbent composition which have been described. In the testing procedure a gravity pass was used in tests 8 and 9. Specifically a 4" square of the filter material (4 layers of the nonwoven polypropylene) was placed in a funnel. 40 ml of the contaminated water sample was poured on the material so that it could not flow around it. The effluent from the funnel was collected in a clean sample bottle for analysis. The retention time in the filter was 1 to 2 seconds. It will be evident from the tabularized data of Table 3 that by use of the filtration methods and devices of the invention, vast diminutions of the MTBE concentrations have resulted.

TABLE 3

| Start With | PST Filtration Materials | Comments | Results |
| --- | --- | --- | --- |
| 1) 333 ppb | Infused Spunbound Polypropylene | 4 min circulation | 140 ppb |
| 2) 333 ppb | Infused Spunbound Polypropylene | 5 min circulation | 74 ppb |
| 3) 333 ppb | Infused Spunbound Polypropylene | 10 min circulation | 60 ppb |
| 4) 333 ppb | Infused Spunbound Polypropylene | 15 min circulation | 52 ppb |
| 5) 333 ppb | Infused Spunbound Polypropylene | 45 min circulation | 25 ppb |
| 6) 3.33 ppm | Infused Spunbound Polypropylene | 1 min circulation | 650 ppb |
| 7) 3.33 ppm | Infused Spunbound Polypropylene | 5 min circulation | 420 ppb |
| 8) 2 ppm | Infused Nonwoven Polypropylene | gravity | 117 ppb |
| 9) 2 ppm | Infused Nonwoven Polypropylene | gravity | 189 ppb |

EXAMPLE 8

A wastewater sample deemed representative of certain types of bilgewater and containing a large variety of contaminants was subjected to filtration using chemical affinity separation devices and methods in accordance with the present invention. The Serfilco cartride unit utilized in the test holds 12 Amtek 10" spunbound polypropylene filters (Ametek, Inc., Sheboygan, Wis. 53082) in a parallel arrangement. Each filter element had been infused with about 17% by weight of the absorbent composition of the invention, by the procedure described in Example 1. A sample was processed in a single pass through the filter assembly. Flow rate through the filter was approximately 30 gpm, with dwell time in the filter assembly being 1 to 2 seconds. The contaminant concentrations for the input and output sample was measured and are shown in Table 3 below. It will be evident that outstanding removal of the organic contaminants has been achieved.

TABLE 4

| Input Wastewater | Purified Filtrate (mg/l) |
| --- | --- |
| Biochemical Oxygen Demand (5 Day) (405.1), mg/l | 230 |
| Suspended Solids (160.2), mg/l | 120 |
| Oil & Grease (1664), mg/l | 14 |
| Phenol (50) mg/l | 0.078 |

EXAMPLE 9

Oil and grease (O&G) adsorption onto an absorbent infused perlite was evaluated using 1 inch gravity driven columns. Preliminary testing shows an 84% reduction in oil and grease with an influent concentration of 83 mg O&G/L. In the procedure used, a particulate perlite was infused with the absorbent composition of the invention using the procedure of Example 1. This resulted in a PST perlite media containing 5 to 10% by weight of the absorbent composition.

A test column was prepared from 1 inch PVC pipe that housed a swatch of porous fabric for media support. The column was packed with 21 grams of the treated perlite media to produce a 9.5 inch depth. Two liters of O&G containing water was prepared by adding small droplets of used 30 weight oil to the entire volume. The solution was mixed thoroughly with small doses being poured through the column immediately after each mixing/shaking. (This shaking and dosing technique was also used to collect a representative influent sample.) Two liters were collected from the testing influent and effluent, and preserved with HCl in amber glass bottles. EPA method 1664 was used for analysis.

The samples were analyzed to produce an influent concentration of 83 mg O&G/L and an effluent concentration of 13 mg O&G/L. This is an 84% reduction in O&G. A control non-treated perlite column test produced a 41% reduction of O&G with an influent of 37 mg O&G/L.

As has been discussed herein, the absorbent compositions used in the present invention are typically reaction products of methacrylate polymers and a drying or semi-drying oil, such as linseed oil. The structure of such a reaction product has been inferred by Raman spectroscopy, IR spectroscopy molecular modeling and NMR studies, as being a polymeric surfactant. This structure makes it effective at inverting both oil-in water (o/w), and water-in-oil (w/o) emulsions. In particular the highly non-polar side of the molecule is very effective in breaking the w/o emulsions. The more hydrophilic side of the molecule has the enhanced ability to exhibit variable HLB's due to the formation of cyclic dienes during synthesis, thus making it effective at demulsifying o/w emulsions in addition to w/o emulsions. This effect can be mediated by altering the fatty acid compositions of the drying oil. Thus it is found that substrates infused with the absorbent composition and then used for filtration in the manner that has been discussed herein, typically display a 99% or higher single pass efficiency for w/o emulsions, and are still able to provide a greater than 33% single pass efficiency for o/w emulsions. This is considered quite surprising, since it would normally be expected that a surfactant with such high affinity for one type of emulsion would have negligible affinity for the opposite type of emulsion.

Residual double-bonds in drying oil fatty acids allow for integration of the chemistry into substrate materials utilizing cross-linking intra and inter-molecularly within the substrate. This allows for permanent integration of the emulsion inverting properties to the substrate. The high oil solubility and the relatively small size of tertiary butyl groups enable the absorbent composition to invert w/o emulsions readily. The HLB ratio on each side of the molecule can be mediated to allow for greater or lesser affinities to particular o/w or w/o emulsions. the absorbent composition's polymeric nature enables it to have opposite surfactant properties on either side of its carbon backbone as opposed to end to end as with common surfactants.

EXAMPLE 10

In this Example the method of the invention was applied to filtration of water in oil (w/o) emulsions. Stock solutions for testing were prepared by addition of the appropriate quantity of Supelco (Supelco Park, Bellefonte, Pa.) standard (i.e. Arochlor 1260 @200 μg/ml in methanol) to 2 gallons of distilled water. Concentrations of stock solutions are determined by analysis using an SRI gas chromatograph GC8610 (SRI Instruments, Torrance Calif.), using the photoionization detector (PID). In the procedure used the filter housing was a Serfilco model S-PL34A which was used in conjunction with a Serfilco centrifugal pump. The filter assembly can hold 3 filters in series, but only one filter is used in these tests. The filters used were 10 inch spunbond polypropylene, 5 micron. The assembly was connected to receive the stock solution and the pump was activated. Flow rate was 1.35 gal/min. Samples are analyzed by the gas chromatograph. In the first test series the filters were infused with the absorbent composition as in Example 1. The input control sample had a PCB concentration of 21 ppb. After one pass through the filter the PCB concentration had been reduced to 7 ppb. After 2 passes through the filter the PCB concentration had been reduced to below detectable limits (BDL).

In a second test series the absorbent composition used to infuse the PST filter differed from that of Example 1. The absorbent composition was prepared by first heating 1000 g of linseed oil to 350° F. 280 g of isobutylmethacrylate and 28 g of 2-ethyl hexanoic acid were then added while mixing and the temperature of the solution was raised to 480°–510° F. This temperature was maintained until out-gassing ceased and a clear pill was obtained. To 100 g of this composition 900 g of acetone was added and the components mixed until the first composition dissolved in the acetone. The filter substrate was then submerged into the infusion solution for 15 minutes, and the filter was removed and allowed to drip. It was then placed in a 120° F. humidity controlled convection oven for 24 hours, and then allowed to air cure for 72 hours. The second test series was then run in the manner of the first series. The input control sample had a PCB concentration of 23 ppb. After one pass through the filter the PCB concentration had been reduced to 2 ppb. After 2 passes through the filter the PCB concentration had been reduced to below detectable limits (BDL).

The absorbent composition used in the second series of tests is more generally prepared using around 50 to 70%(by weight of the entire absorbent composition) of linseed oil and 5 to 15 % by weight of the 2-ethyl hexanoic acid. The isobutylmethacylate is added as approximately 20 to 30% by weight of the absorbent composition. For some applications it is also desirable to combine tung oil with the linseed oil in an approximate 50:50 ratio.

EXAMPLE 11

The same absorbent composition and treated PST filter substrates as were used in the second series of tests in Example 10 was used in the filtration of an emulsion of bitumen and water—containing organic emulsifiers. This emulsion was an oil in water (o/w) emulsion. The filtration apparatus was as described in Example 6. 4 ml of the emulsion was mixed into 4 liters of water to provide the test sample. The starting control sample was 1% w/w of emulsion. After 1 minute recirculation through the filter the emulsion was reduced to 0.6%w/w. After 2 minutes it was reduced to 0.4% w/w; after 3 minutes, to 0.2% w/w; after 4 minutes it was reduced to 0.1 % w/w; and after 5 minutes the emulsion level was BDL.

EXAMPLE 12

The apparatus and filtration arrangement of Example 10 was use to filter simulated bilgewater samples in order to determine reduction in observed sheen. The absorbent composition and the test apparatus was substantially that used in the first test series of Example 10. Flow rates utilized through the filter were 20 gal/min, with dwell time in the filter assembly being approximately 1 second. Results were as follows:

TABLE 5

| Oil No. 1 | Oil No. 2 | Visual | Polarized Light | IR* |
|---|---|---|---|---|
| 0.01% | 0.01% | BDL | BDL | BDL |
| 0.05% | 0.05% | BDL | BDL | BDL |
| 0.10% | 0.10% | BDL | BDL | BDL |
| 0.50% | 0.50% | BDL | BDL | BDL |
| 1.00% | 1.00% | BDL | BDL | BDL |
| 5.00% | 5.00% | BDL | BDL | BDL |
| 10% | 10% | BDL | BDL | BDL |
| 50% | 50% | BDL | BDL | BDL |

Test Oil No. 1 composition—Equal parts of Venezuelan Light Crude, Venezuelan Heavy Crude, #2 Diesel, transmission fluid, and lubrication grease. Test Oil No. 2—As in #, but 1 emulsified with 2-butoxy ethanol in high shear blender.
* Analysis performed utilizing solvent extraction followed by IR spectroscopy.

EXAMPLE 13

Tests have been conducted to determine the pressure increase across an infused PST filter in accordance with the invention as it absorbs oil to its saturation point. The graph shown in FIG. 1 depicts typical results where a heavy and a light oil are removed by passage of an oily bilgewater through a PST filter of the type prepared in Example 1. Specifically it will be seen that there is little additional pressure drop caused by absorption of oil by the infused filters. The ability of such an infused filter to absorb large amounts of oils and other organic compounds without appreciable pressure increase across the filter makes this filter especially valuable in the present use.

Prior art polymer treated oleophilic filters have been generally ineffective in organic prefiltration due to high pressure drop after capturing and fouling with organic compounds. This is due to the swelling of the polymer/organic foulant coagulate. The novel oleophilic polymer of the present invention can be permanently cured into practically any filter substrate. What makes this molecule novel, aside from its high affinity for organic compounds, is that the polymer itself and its coagulate product with oil is viscoelastic. Generally, viscoelastic materials become more viscous and denser with shear. Essentially, the opposite of swelling occurs. Viscoelastic oleophilic curable polymers actually contract when sheared, as is the case when water flows through a filter. This is a very important fact because as water passes through the filter the coagulate contracts allowing for essentially zero pressure drop across the filter to saturation.

FIG. 1 illustrates typical pressure characteristics of a viscoelastic oleophilic filter. The filter was dosed with high viscosity Venezuelan no. 6 crude oil which tends to easily form tar balls and is usually able to clog any filtration material. It will be noted that the filter absorbed approximately its own weight in no. 6 crude before breakthrough and displayed less than 1-psi pressure increase. This is the missing link to effective prefiltration of organic foulants.

PST filters in accordance with the invention are extremely valuable when used to augment the performance of cross current flow membrane filters. Cross current flow membrane technologies essentially work as molecular sieves and have been used to produce pure water in municipal and industrial applications. Cross flow operations typically fall into three categories:

Ultrafiltration (UF)
Nanofiltration (NF)
Hyperfiltration, more commonly known as Reverse Osmosis (RO)
Particle size and molecular weight ranges are as follows:
* RO—5 to 15 angstroms
  100 to 300 MW
  Components Retained: 99% of most ions, most organics over 150 MW
  Processing Applications: Brackish seawater, desalting, boiler feed purification, blowdown reclamation, pretreatment to ion exchange, ultrapure water production.
NF—10 to 80 angstroms
  200–10,000 MW
  Components Retained: 95% divalent ions, 40% monovalent ions, organics greater than 150–300 MW.
  Process Applications: Hardness removal, organic and microbiological removal, dye desalting, color removing.
UF—100 to 1000 angstroms
  1,000–100,000 MW
  Components Retained: Most organics over 1000 MW.
  Process Applications: Pre- and post-treatment ion exchange, beverage clarification, concentration of industrial organics and dilute suspended oils, removal of pyrogens, bacteria, viruses, and colloids.

The most commonly used of these operations is Reverse Osmosis, due to its high capability for removal of dissolved impurities. There are four major configurations for membrane modules: plate and frame units, hollow fiber, and tubular and spiral wound. Membranes are available in a variety of materials. Some common ones are cellulosic and polyamide for RO and NF and polysulfone, ceramic and fluorinated for UF. UF has molecular weight cutoff of 1,000 to 100,000. Pressure ranges are UF-25 to 400 psi, RO and NF operate in the 500 to 1000 psi range. Crossflow is necessary in membrane systems due to the necessity of running continuously in a self-cleaning mode. This is due to the fact that even a tiny fraction of foulant mass can have a severe effect on membrane performance. Backwashing is not possible because the polymeric membrane is coated onto a support layer. Flow reversal causes separation of membrane from support layer. All cross-flow systems separate the influent waste stream into two effluent streams. These are the permeate (purified water which has passed through the membrane) and concentrate (pollutants rejected by membrane) that must be continuously flushed away.

The inherent tendency of membranes to catch all but the smallest particle sizes renders them susceptible to fouling by organic, inorganic and biological materials. Cross-current flow does not suffice in keeping the membranes clean, so they must be periodically cleaned. This can be very difficult as membrane chemical compatibility may be similar to those of the fouling agent, in which case, the cleaner will also dissolve the membrane. Short of dissolution, membranes can be denatured by solvents, high or low pHs and temperature extremes. At the very least, membrane/cleaner compatibility must be tested. It is unlikely that membrane cleaning will ever be totally eliminated even with the use of low concentrations of chemical cleaning agents in the process stream (Ning). Effective pre-filtration of particulate and chemical fouling agents is one remedy when designing a membrane filtration system.

Figure 2:
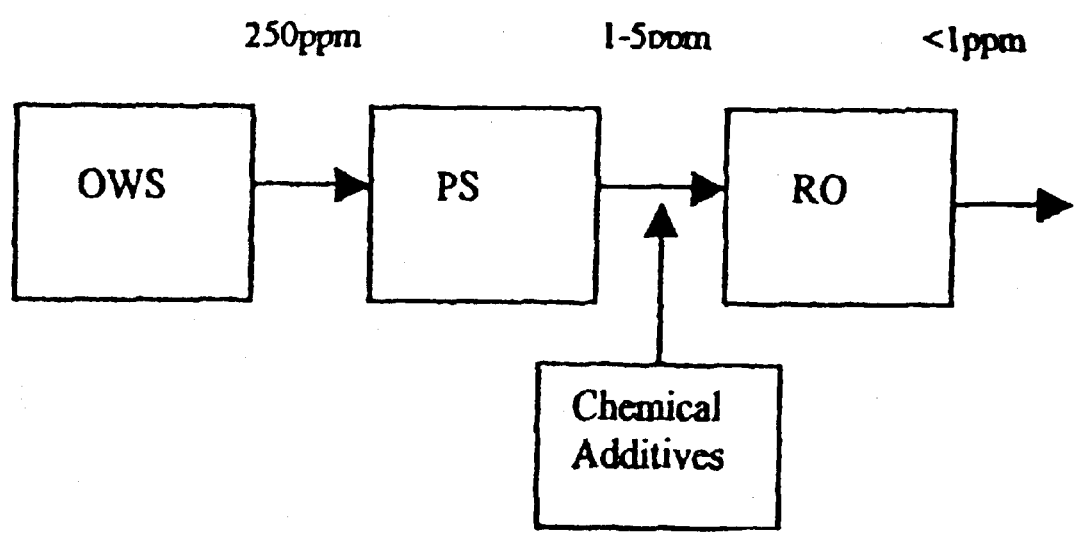
FIG. 2 is a schematic block diagram of a system wherein a PST filter in accordance with in the invention is used to reduce fouling in a crossflow membrane filter.

In accordance with a further aspect of the present invention, the PST filters prepared by the invention can be used to effect pre-filtration to enhance the robustness and performance of membrane filtration systems. As stated earlier, these systems are susceptible to organic and metallic colloid fouling. The ability of PST units to absorb concentrated slugs without breakthrough or pressure drop makes them ideal chemical prefilters to work in conjunction with membrane systems. Most of the time the membrane will see clean water greatly reducing fouling and preserving capacity. The membrane capacity is conserved for NF or RO range pollutants. Viscoelastic oleophilic prefiltration technology is very effective at removing higher molecular weight non-aqueous phase compounds, however highly soluble organic compounds (i.e., ethylene glycol) are not captured by these filters. A suitable system 10 utilizing a PST filter is shown in FIG. 2. An OWS unit 12 receives the initial bilgewater 14, and provides partially purified output to PST filter 16. The output from the latter then is provided as input to an RO cross flow membrane filter 18. Representatively initial discharge concentrations are reduced to 250 ppm by the OWS, then to 1–5 ppm by 1 the PST filter, and finally to less than 1 ppm by the RO filter. At the same time tests indicate that membrane life at RO filter 16 is extended about twenty-fold while operating costs are reduced by 50%.

With a composite unit as illustrated in FIG. 2, crossflow membranes can be totally protected from organic fouling. The RO membrane post PS will see clean water eliminating organic fouling and reserving flux. Membrane capacity is consequently reserved for what the membranes do best, namely removing soluble compounds with molecular diameters greater than that of water. These soluble materials, due to their low concentrations, low film thickness, and high solubility are then effectively treated using low concentrations of surface-active chemical dopants. Surfactants used in this way have very low impact on membrane integrity.

EXAMPLE 14

A major industrial manufacturing plant extensively uses RO to recover precious process water due to its location in the desert where water is scarce. This facility initially attempted recover of process water utilizing membrane technology. They found that maintenance, cleaning and replacement of membranes only gave them 50% of their initial projected yield. The system was deemed effective but uneconomical. Consequently, viscoelastic PS filters were deployed as RO membrane prefilters. After processing nearly a million gallons of water the facility has found that membrane service life has extended ten-fold, resulting in a 50% decrease in cost to treat and a twenty-fold efficiency increase. The facility has implemented this composite technology plant wide, and has allowed the plant to be practically close-looped with their process water.

EXAMPLE 15

The wastestream in this Example was generated by an industrial facility. It had a complex nature and heavy oil loading, making it similar to the wastestreams that are encountered in RO treatment applications.

More specifically this was a complex organic wastestream composed of PCB's, colloidal lead and copper and extremely high oil organic loading. After pretreatment by passing through a PST filter as in Example 13, essentially all PCB's were removed to BDL. Total petroleum hydrocarbon (TPH) and total oil and gas (O&G) loading initially exceeded 18,000 ppm and all of this material was removed to BDL. Colloidal lead was reduced from 33.5 ppm to 0.019 ppm and copper was reduced from 11.5 ppm to BDL. Maximum influent concentration exceeded 140,000 ppm (in other words a concentrated slug) and all this material was removed in a single pass with less than 1 psi differential pressure across the PST filter. In this example, the using facility was paying 25 cents per gallon disposal cost. After treating approximately 1 million gallons utilizing PST filters this cost was reduced to 2.6 cent per gallon. A membrane filtration system exposed to this wastestream without the benefit of the PST prefilter would experience significant fouling problem. The primary causes of fouling, namely colloidal metals and organic materials are thus virtually totally eliminated by the PST filters.

While the present invention has been set forth in terms of specific embodiments thereof, the instant disclosure is such that numerous variations upon the invention are now enabled to those skilled in the art, which variations yet reside within the scope of the present teaching. Thus for example while the invention has been particularly described for its use in treating bilgewater, it will be evident that comparable oily waste water originating from industrial plants and the like may similarly be benefitted by treatment according to the invention. Accordingly, the invention is to be construed broadly, and limited only by the scope and spirit of the claims appended hereto.

What is claimed is:

1. A method for improving the efficiency and usable life in a cross flow membrane filter used to remove contaminants from bilgewater or similar aqueous systems, comprising passing said bilgewater upstream of the cross filter membrane through a fluid-pervious filtration media which has been infused with an absorbtion composition comprising a homogeneous thermal reaction product of an oil component selected from the group consisting of glycerides, fatty acids, alkenes, and alkynes, and a methacrylate or acrylate polymer component; said contaminants being thereby immobilized at said media to reduce fouling at the downstream membrane filter; and providing the at least partially purified output from said infused filtration media, as input for said cross flow membrane filter.

2. A method in accordance with claim 1, wherein the contaminants comprise organic compounds which are at least slightly soluble in the aqueous phase of the bilgewater.

3. A method in accordance with claim 2, wherein the contaminants are selected from one or more members of the group consisting of oils, benzene, toluene, xylene, halogenated hydrocarbons, and ethoxylated gycols.

4. A method in accordance with claim 1, wherein the contaminant comprises metal ions selected from one or more members of the group consisting of cadmium, chromium, copper, lead, nickel, zinc, arsenic, silver, and mercury.

5. A method in accordance with claim 1, wherein the bilgewater is oily, and said contaminants are removed to a sufficient level to eliminate visible sheen when the thereby treated bilgewater is discharged into a body of navigable water.

6. A method in accordance with claim 1, wherein the contaminant is a mixed oily emulsion.

7. A method in accordance with claim 1, wherein the contaminant includes lipophilic and hydrophilic organic compounds.

8. A method in accordance with claim 1, wherein the contaminant comprises a colloidal metal.

9. A method in accordance with claim 1, wherein the said media comprises a nonwoven polypropylene.

10. A method in accordance with claim 1, wherein the said media comprises paper.

11. A method in accordance with claim 1, wherein the said media comprises a porous ceramic.

12. A method in accordance with claim 1, wherein the said media comprises a metal.

13. A method in accordance with claim 1, wherein the said media comprises a mineral particulate.

14. A method in accordance with claim 13, wherein the said mineral is vermiculite.

15. A method in accordance with claim 13, wherein the said mineral is perlite.

* * * * *